United States Patent [19]

Dann

[11] Patent Number: 5,255,369
[45] Date of Patent: Oct. 19, 1993

[54] MULTIPROCESSOR SYSTEM WITH REFLECTIVE MEMORY DATA TRANSFER DEVICE

[75] Inventor: James C. Dann, Caterham, England

[73] Assignee: Encore Computer U.S., Inc., Ft. Lauderdale, Fla.

[21] Appl. No.: 758,893

[22] Filed: Sep. 11, 1991

Related U.S. Application Data

[63] Continuation of Ser. No. 642,457, Jan. 17, 1991, Pat. No. 5,072,373, which is a continuation of Ser. No. 401,511, Aug. 30, 1989, Pat. No. 4,991,079, which is a continuation of Ser. No. 710,229, Mar. 11, 1985, abandoned.

[30] Foreign Application Priority Data

Mar. 10, 1984 [GB] United Kingdom ............... 8406322
Aug. 14, 1984 [GB] United Kingdom ............... 8420617

[51] Int. Cl.⁵ .............................................. G06F 13/38
[52] U.S. Cl. ...................... 395/200; 364/DIG. 1; 364/228.3; 364/228.1; 364/246.7; 364/238.7; 364/259.2
[58] Field of Search ............... 364/DIG. 1; 395/200, 395/325

[56] References Cited

U.S. PATENT DOCUMENTS

| | | | |
|---|---|---|---|
| 3,618,045 | 11/1971 | Campbell et al. | 364/200 |
| 3,845,474 | 10/1974 | Lange et al. | 364/200 |
| 3,873,819 | 3/1975 | Greenwald | 235/153 |
| 3,889,237 | 6/1975 | Alferness et al. | 364/200 |
| 3,940,743 | 2/1976 | Fitzgerald | 364/200 |
| 4,007,450 | 2/1977 | Haibt et al. | 364/200 |
| 4,056,844 | 11/1977 | Izumi | 364/200 |
| 4,209,839 | 6/1980 | Bederman | 364/200 |
| 4,212,057 | 7/1980 | Devlin et al. | 364/200 |
| 4,228,496 | 10/1980 | Katzman et al. | 364/200 |
| 4,253,146 | 2/1981 | Bellamy et al. | 364/200 |
| 4,335,426 | 6/1982 | Maxwell et al. | 364/200 |
| 4,351,025 | 9/1982 | Hall, Jr. | 364/200 |
| 4,356,550 | 10/1982 | Katzman et al. | 364/DIG. 1 |
| 4,388,686 | 6/1983 | Haid | 364/DIG. 1 |
| 4,394,731 | 7/1983 | Flusche et al. | 346/200 |
| 4,414,624 | 11/1983 | Summer, Jr. et al. | 364/DIG. 1 |
| 4,417,303 | 11/1983 | Korowitz et al. | 364/DIG. 1 |
| 4,442,487 | 4/1984 | Fletcher et al. | 364/200 |
| 4,453,215 | 6/1984 | Reid | 364/DIG. 1 |
| 4,527,238 | 7/1985 | Ryan et al. | 364/200 |
| 4,539,637 | 9/1985 | DeBruler | 364/200 |
| 4,642,755 | 2/1987 | Hinch | 364/200 |
| 4,669,043 | 5/1987 | Kaplinsky | 364/200 |

FOREIGN PATENT DOCUMENTS 0092895 11/1983 European Pat. Off.
0251686 1/1988 European Pat. Off.

OTHER PUBLICATIONS

Frank, "Tightly Coupled Multiprocessor System Speeds Memory-Access Times", *Electronics International*, vol. 57, (1984), Jan., No. 1, pp. 164-169.

Dixon, "Group Address Structure for Network Service Nodes", *IBM Technical Disclosure Bulletin*, vol. 26, No. 3A, Aug. 1983, pp. 1198-1200.

*Primary Examiner*—Thomas M. Heckler
*Attorney, Agent, or Firm*—Keck, Mahin & Cate

[57] ABSTRACT

A real time data processing system in which each of a series of processing nodes is provided with its own data store partitioned into a first section reserved for the storage of data local to the respective node and a second section reserved for the storage of data to be shared between nodes. The nodes are interconnected by a data link and whenever a node writes to an address in the second section of a data store the written data is communicated to all of the nodes via the data link. The data in each address of the second sections of the data stores can be changed only by one respective processing node which acts as a master for that address. As each address containing shared data can only be written to by one node collisions between different nodes attempting to change a common item of data cannot occur.

46 Claims, 7 Drawing Sheets

MULTIPROCESSOR SYSTEM WITH REFLECTIVE MEMORY DATA TRANSFER DEVICE

This is a continuation of application Ser. No. 07/642,457, filed Jan. 17, 1991, now U.S. Pat. No. 5,072,373, which is a continuation of application Ser. No. 07/401,511 now U.S. Pat. No. 4,991,079, which is a continuation of application Ser. No. 07/710,229 filed Mar. 11, 1985, now abandoned.

The present invention relates to data processing systems including two or more data processing units each having access to the same data. Each data processing unit may be a substantially independent computer, or may interact with one or more of the other processing units. Data processing units of either type are referred to below as "nodes", and data to which two or more nodes have access is referred to below as "shared data".

In one known system used in for example flight simulators, shared data is held in a common data store, accessible to two or more nodes. Each node may also have its own local store for holding data to which only that node has access. A problem with such a system is that the nodes must compete for access to the shared store and hence there may be conflict between two or more nodes each attempting simultaneously to access the same item of shared data in the common store. Moreover, there are significant transmission delays between the shared store and relatively distant nodes. As a result, access to the shared data may be very slow.

U.S. Pat. No. 3,889,237 describes a two node system in which each node receives in its own local store a duplicate copy of the shared data. To ensure that both copies are kept consistent, each node has direct access to the local store of the other node so that it can write a new value of the shared data into both stores simultaneously. A problem with this prior proposal is that conflict arises between the nodes if both attempt to access the same item of shared data at the same time, and each node must wait for all writes to the shared data portions of the local stores to be completed before it can continue processing. This seriously reduces the efficiency of the system. This makes it very difficult to extend this proposal to more than two nodes.

European Patent Specification No. 0 092 895 describes another system in which each node has its own local store in which shared data is stored. The nodes are interconnected by a data transmission link and whenever one node writes to an address containing shared data in its local store it also generates a message containing the write data and the address. The message is applied to the link and the other nodes use the write data to update the appropriate shared data address in their local stores. Each node continues processing after writing to a shared data address and does not wait for the write data message to reach the other nodes. The link is organised as a token ring, there being only one token so that only one message can be on the ring at any one time. Thus each node receives messages in the same sequence, thereby establishing a chronological order for the messages even though the individual nodes are operating asynchronously. However, if a first node receives a write data message from a second node while the first node still has an outstanding write data message to transmit, the received message may overwrite the data address which has already been written to by the second node. The data address would then be overwritten by a chronologically earlier value and the data stored in the shared data stores of the various nodes would not be consistent. To prevent this happening, the processor of the second node is suspended pending clearance of the outstanding message or messages. Suspension of the processors obviously slows down the systems operation and where there is a heavy traffic of messages this is a serious problem.

In real-time computing systems, such as those used for flight training simulators, the speed at Which the system operates is of fundamental importance. It is known to provide real-time systems in which a series of nodes each performs a particular function but within a time-framework imposed by a system control computer. Examples of such systems are described in U.S. Pat. Nos. 4,414,624 and 4,351,025.

In U.S. Pat. No. 4,414,624, the operations of the nodes are scheduled by the control computer according to the processing required. At the beginning of each frame a time control word is transmitted to each node to establish the time available for processing. Each node has a local store for shared data and each node can globally write to any or all the local stores of the other nodes simultaneously. All data is first written to a common store and then the required data is read out to the local stores from the common store. Thus each update of an item of data in a local store requires both a write to the common store step and a read to the local store step. This slows down the operating speed of the system.

In U.S. Pat. No. 4,351,025, real-time operation of the nodes and the system control computer are interleaved without overlap, write data from the nodes being distributed during the operating time segment of the system control computer. This arrangement is relatively easy to implement but relatively slow in operation as the two parts of the system operate alternately, not continuously.

Thus, in the prior art systems, including real-time systems, a rigid operating protocol is established to maintain the coherence of the shared data in the separate local stores. This rigid protocol inevitably restricts the speed and flexibility of the systems.

It is an object of the present invention to obviate or mitigate the above problems.

According to the present invention, there is provided a real-time data processing system comprising at least two processing nodes, a data store in respect of each node, each data store being partitioned into sections a first one of which is reserved for the storage of data local to the respective node and a second one of which is reserved for the storage of data to be shared between nodes, a data link interconnecting the nodes, means at each node for generating a write message comprising an address and data to be written to that address whenever that node writes to an address in the second section of a data store, means for transmitting each generated message via the data link to each of the nodes, means for allocating to each address in the second sections of the data stores a respective node which is to be the master node for that address, and means for preventing data being written to any address in the second section of a data store other than by the allocated master node.

As each address of the data stores which contains data shared between the nodes can be written to by only one node processor it is not necessary to. impose rigid controls on the priority allocated to write messages to ensure that the shared data does not become corrupt. This enables the speed of operation of the system to be enhanced, but in addition it enables a relatively large number of nodes to be run in parallel using standard processing units without complex operating procedures. Thus a wide range of different real-time system requirements can be met relatively easily. For example, the present invention has applications in flight and other simulators, process control systems, and fire control systems.

Preferably an address range comparator is provided in respect of each node for comparing the address of a data write message generated by that node with a preset range of addresses and for transferring the data write message to the data link only if the, compared address is within the preset range. Thus the address comparator effectively determines which addresses in the shared data can be written to by the respective nodes. A further address comparator can be provided in respect of each node for comparing the address of a data write message received from the data link with a preset range of addresses and for transferring the received data write message to the local data store only if the compared address is within the preset range of addresses. Thus the further address comparator determines the addresses within a local store to which data can be written from the date link.

The nodes can be connected in parallel by a single data link or in parallel by a plurality of data links. Furthermore more complex system structures can be provided. For example the nodes can be arranged in a plurality of groups with the nodes in each group being connected in parallel by a respective data link and at least one of the nodes belonging to two of the groups. In this arrangement the section of the data store receiving shared data at the node belonging to two groups is divided into a plurality of subsections each of which receives data to be shared with the nodes of a respective group. Software is provided to control the transfer of data from one subsection to the other when data is to be shared between two groups of nodes.

Preferably a further memory is provided connected to the data link to which input/output data can be written by the nodes. Addresses dedicated to this purpose would be provided in the local data stores of the nodes from which data can be read and to which data can be written via the data link.

Embodiments of the present invention will now be described, by way of example, with reference to the accompanying drawings, in which.

Figure 2:
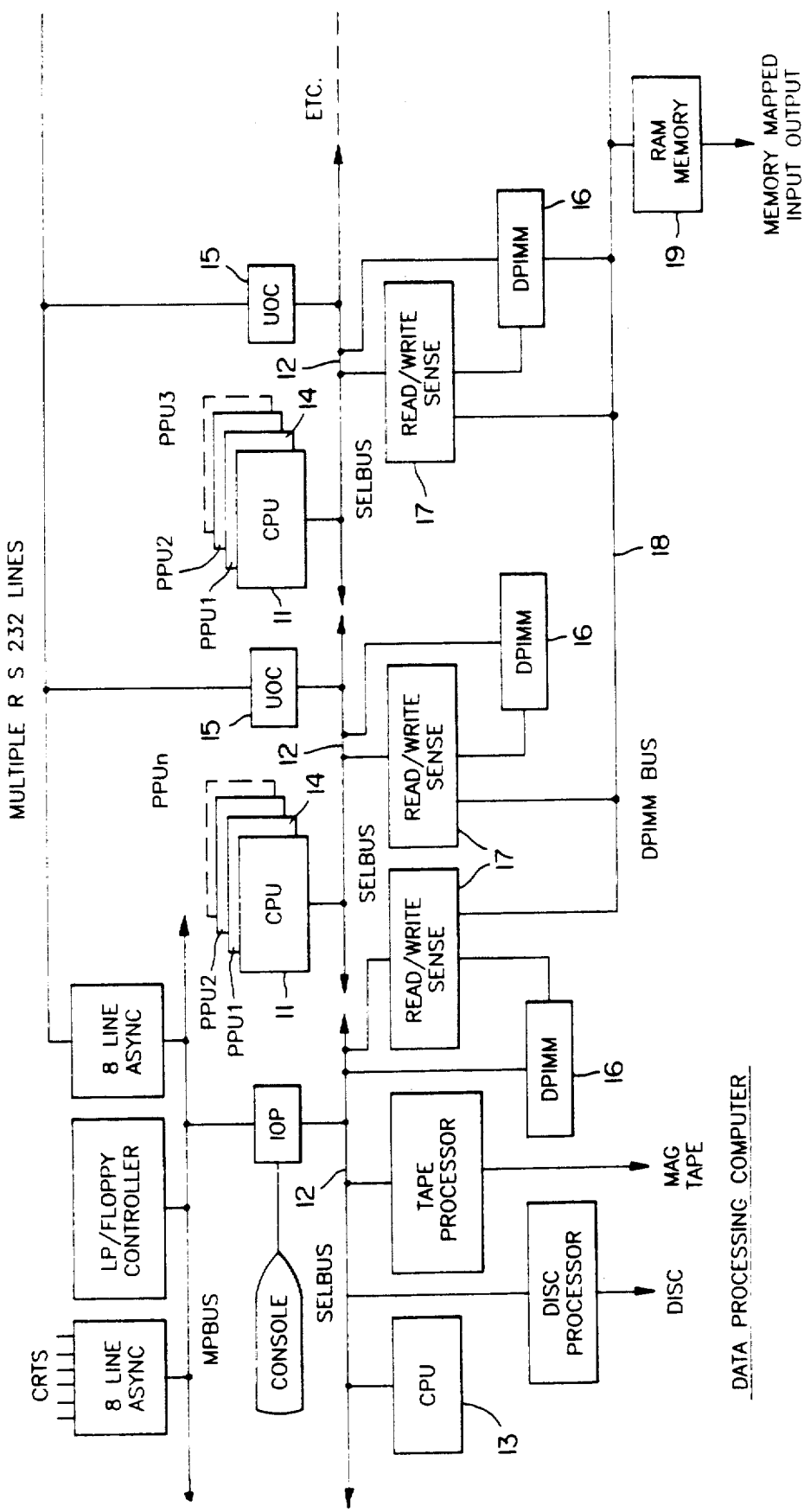
FIG. 2 is a block schematic diagram of an embodiment of the present invention.
Figure 3:
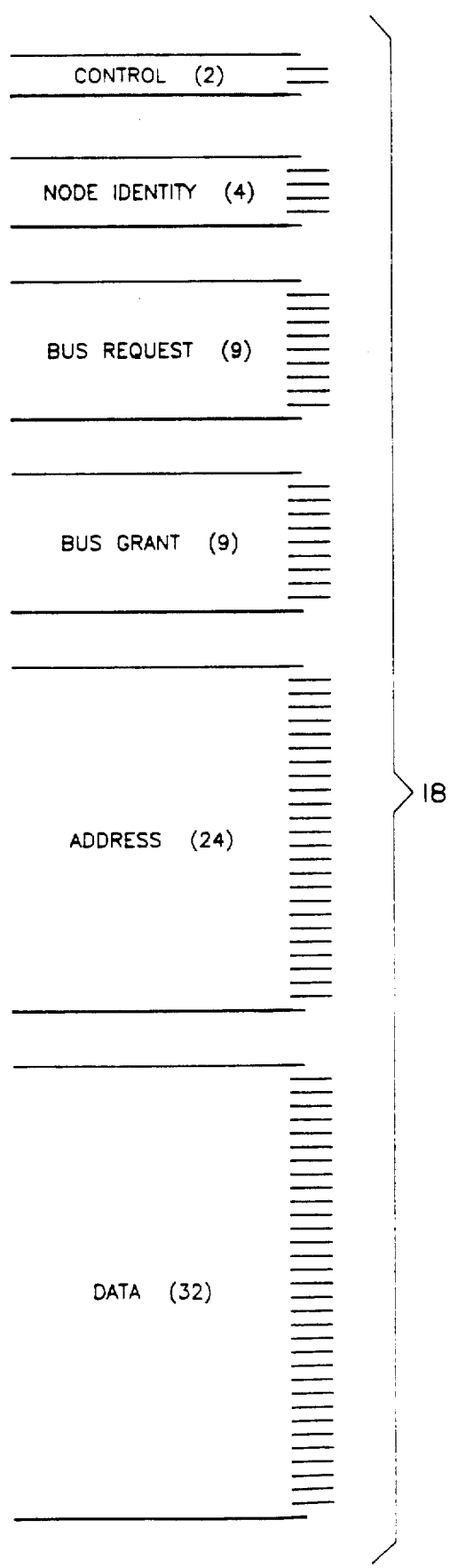
Figure 4:
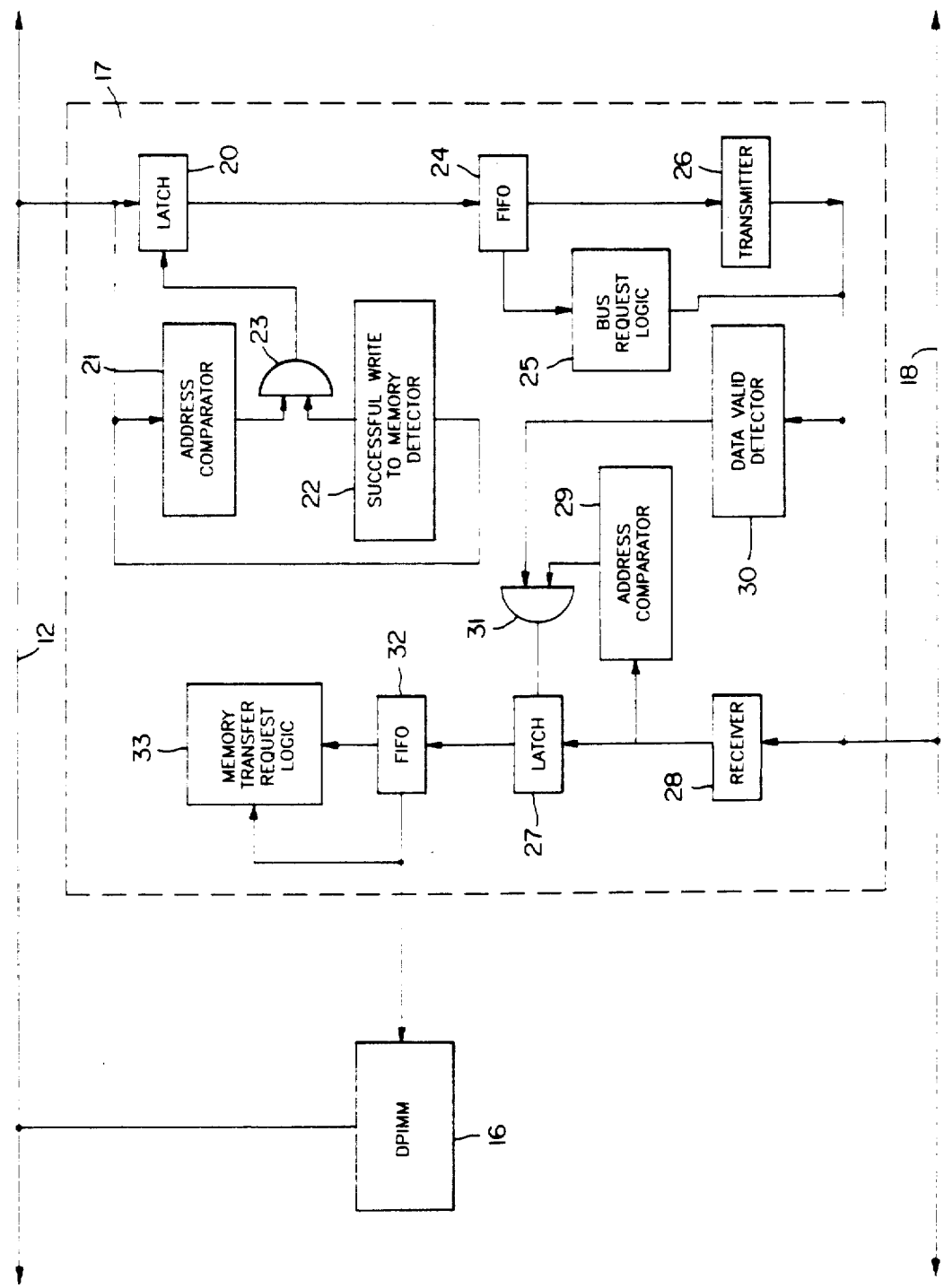

FIG. 3 schematically illustrates the lines provided on a data bus shown in FIG. 2;

FIG. 4 is a block schematic diagram of read/write sense hardware shown in FIG. 2; and FIGS. 5, 6, 7, 8 and 9 schematically illustrate alternative structures for systems embodying the present invention.

Figure 1:
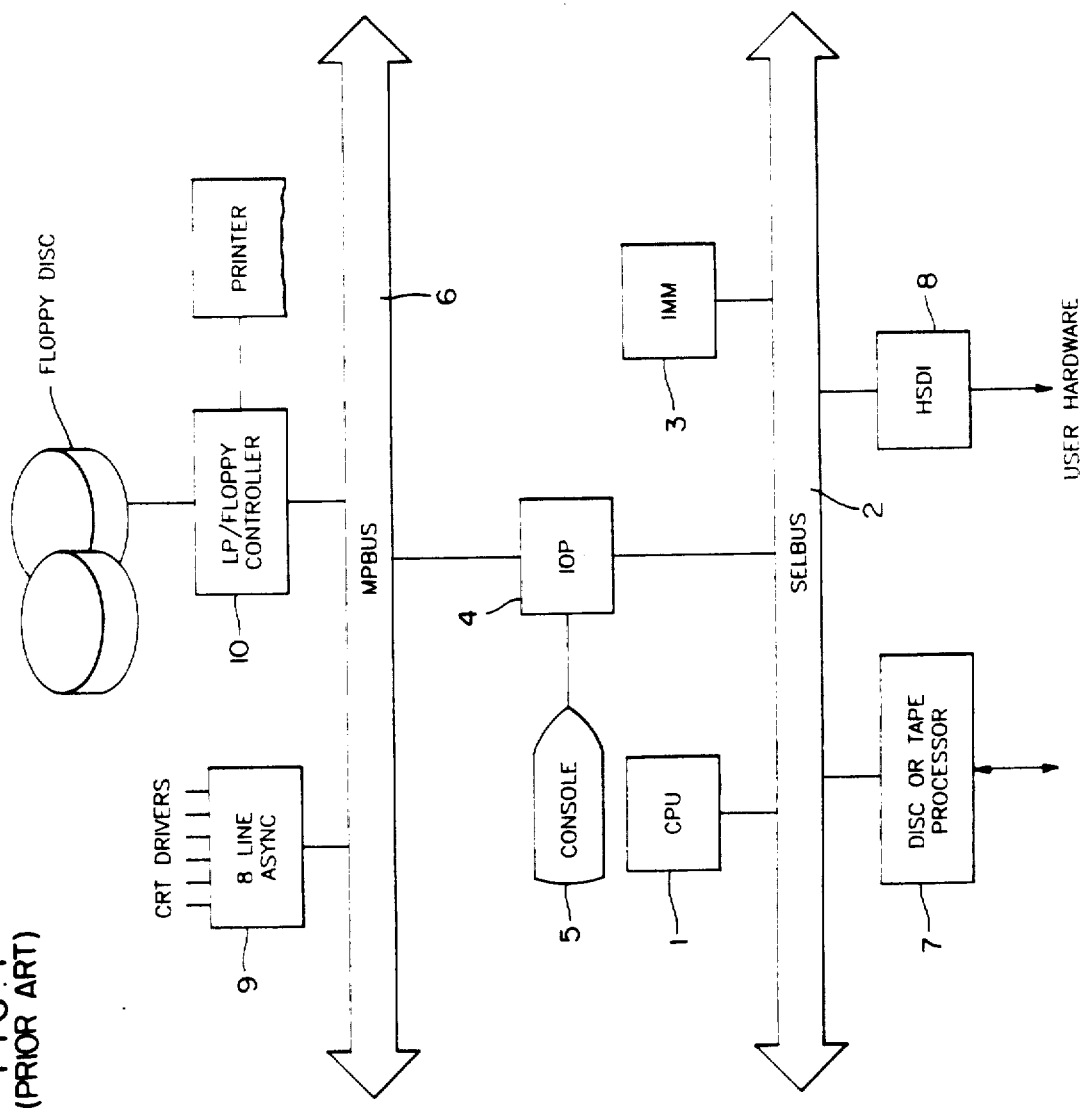
FIG. 1 is a block schematic diagram of a known data processing system.

Referring to FIG. 1, the illustrated known system is a commercially available system based on the GOULD Computer Systems Division 32/27 computer. A central processor unit (CPU) 1 resides on a 26.6 MB/Sec computer bus 2 known as a "SELBUS" which is the main fast communication bus. A data store in the form of an Integrated Memory Module (IMM) 3 provides 1 MB of memory and associated memory control logic. An IOP unit 4 is a controller which supports a system console 5 and is the master controller for a 1 MB/Sec Multi Purpose Bus (MPBUS) 6.

High speed devices such as Disc or Tape controllers 7 and high speed device interface (HSDI) 8 connect to the SELBUS 2. Low speed peripherals such as CRT terminal controllers 9 (B line asynchronous operation), line printer/floppy disc controllers 10, etc. connect to the MPBUS 6. The terms "SELBUS", "IMM", "IOP", "MPBUS", "IPU" and "HSDI" are those used by the manufacturer to describe elements of the known GOULD 32/27 computer system and different nomenclature may be used by other manufacturers for equivalent components. The GOULD nomenclature is used herein simply for the sake of convenience.

A system according to the invention is illustrated in FIG. 2. The illustrated system comprises a series of processing units 11 each based on a GOULD 32/27 computer. Each processing unit 11 has its own SELBUS 12 and operates asynchronously of the others. The processing units 11 do not drive peripherals, but are connected to a further processing unit 13 which is provided with a full complement of support peripherals. Each of the processing units 11 handles processing relating to a particular aspect of the system, for example in a flight simulator system one unit 11 would calculate flight parameters, e.g. altitude, one unit 11 would calculate engine parameters, e.g. thrust, another unit 11 would calculate autopilot parameters, and so on. Each processing unit 11, 13 and its associated equipment such as data stores constitutes a node of the system.

As the computing nodes incorporating processing units 11 do not drive peripherals the required input/output capacity of these nodes is limited, all slow input/output operations being executed by the front end processing unit 13. This maximises the available real time computing power of each computing node. A secondary RS 232 channel (multiple RS 232 lines) provides for initialisation and control functions, and also aids diagnostics if the system fails.

Each CPU 11 is augmented by a number of physically similar Parallel Processor Units (PPU) 14. Each PPU 14 is similar to the GOULD Internal Processor Unit (IPU) featured on the 32/67, 32/77 and 32/37 GOULD computers but extended in accordance with conventional techniques to allow for more than two 32/27 processors per SELBUS 12.

An Unattended Operators Console (UOC) 15 is associated with each unit 11. The UOC 15 is essentially an IOP (FIG. 1.) with extra logic to obviate the need for an MPBUS as normally provided when peripherals are to be driven.

The SELBUS 12 of each CPU 11, 13 is connected by a DPIMM 16 (a dual port IMN) and read/write sense logic 17 to a 26.6 MB/Sec data link 18 or reflected memory bus. The DPIMM 16 is available from GOULD and is normally arranged with the second port connected to peripheral equipment, i.e. for input/output purposes. In the illustrated arrangement however, the DPIMM 16 is used to enable the provision of a "reflective memory" system in accordance with the invention.

The principle of the illustrated reflective memory system is that each DPIMM data store 16, which contains 2 MB of memory, is logically partitioned at a predetermined point. All data and program on one side of the predetermined point is local to the SELBUS 12 of the unit 11 or 13 on which the DPIMM 16 resides, and all data and program on the other side of that point is shared via the bus 18 with the other units 11, 13. The read/write sense hardware 17 converts the usage of the DPIMM 16 to a local/shared system. The read/write sense logic unit 17 is connected to the second port on each DPIMM 16. If a CPU 13, 11 (or PPU 14) writes to an address in the shared portion of its associated DPIMM 16 this is detected by the read/write sense hardware 17 and the address and data is put on to the reflected memory bus 18. All DPIMM's 16 then automatically accept this data and enter it into their own memory. Thus all DPIMM's 16 have a copy of all of the shared data within their own memories. Each processing unit can thus access data it requires directly from its respective data store (DPIMM 16). Access is never delayed as the result of another processor accessing the same data store.

It is of fundamental importance to prevent "collisions" due to two or more processors trying to manipulate the same data item simultaneously. This is done by the read/write sense logic unit 17 that as described above is used to issue a single write command to each of the other nodes of the system. Each node has its own unique address partition so that only one node is capable of writing data to any one address in the shared data sections of the data stores, the address for an item of data in one data store 16 being the same as the address for that same item of data in all the other data stores 16. Thus although all nodes may be able to write to the shared data sections of all the data stores 16, the only transactions which actually do so are those in which the address to which data is to be written lies within the memory segment for which that system is "master". For example, in a flight simulator comprising a flight processor, only that processor can actually change the stored value for altitude because altitude is within its address limits but outside the address limits of all the other processors. The other processors can read the stored altitude value but cannot change it. Thus numerical discrepancies are avoided without it being necessary to provide complex procedures to maintain the same chronological order for updates to the shared data in the different data stores.

As an additional feature the read/write sense hardware 17 can detect input/output read and write requests to addresses dedicated to input/output data in the DPIMM's memory 16. The address represents a location in a RAM memory 19 which is connected to user input/output high speed equipment, e.g. a Flight Simulator Input/Output linkage. This allows fast acquisition of data. (The DPIMM 16 has been used previously for input/output functions, but in block mode transfer, not for individual data element transfer). This type of input/output can be referred to as Memory Mapped input/output.

The handling of communications between the SELBUS 12 of any one node and the reflected memory bus 18 will now be described in greater detail with reference to FIGS. 3 and 4.

The buses 12 and 18 each carry parallel data, address, bus organisation and bus control signals at a rate of 26.6 MB/Sec. This data rate can be maintained for a bus length of forty feet but must be reduced if the bus is longer than this, e.g. to 13.3 MB/Sec for a bus eighty feet long. FIG. 3 schematically illustrates the bus 18, which has thirty two data lines, twenty four address lines, nine bus request lines, nine bus grant lines, four node identity lines, and control lines only two of which are shown as being of relevance to the communication of data via bus 18. There are nine nodes in all, each allocated respective bus request and grant lines, one node comprising CPU 13 and the others each comprising one CPU 11.

FIG. 4 shows in greater detail than FIG. 2 the arrangement of the DPIMM 16 and read/write sense logic 17 connected between bus 12 and bus 18. Assuming that the node processor associated with the arrangement of FIG. 4 writes to the data store 16, the data to be written and its address is loaded into latch 20 and the address to which it is to be written is loaded into an address comparator 21. Assuming that the data is successfully written to the store 16, a "successful write" signal is delivered to a detector 22. The successful write signal will be carried by one of the control lines of the bus 12 in an entirely conventional manner. If the address is not within a predetermined range set by the comparator 21, it relates to local data and is not to be shared with the other nodes. If on the other hand it is within the set range, the comparator provides an output to an AND gate 23. The detector 22 also provides an output to the gate 23 which controls the latch 20 so that the address and data in the latch 20 is loaded into a first in first out (FIFO) register 24 only if the address is within the set range and the successful write signal has been detected.

The FIFO 24 can assemble a queue of up to sixty four messages for transmission although normally there will be only one or two messages in the queue. If a queue of sixty or more messages are assembled a "busy" signal is delivered to the system so as to increase the priority of the respective node when making bus access requests. An appropriate circuit (not shown) is provided to suspend the associated node processor if the FIFO is filled up with messages awaiting transmission.

When the FIFO 24 stores a message for transmission, this is detected by a bus request logic circuit 25 which outputs a bus request signal onto the respective line of bus 18. The bus request signal is transmitted to the CPU 13 (FIG. 2) which controls the operation of the bus 18. The CPU 13 grants access to the nodes which have messages to transmit one at a time in a preset order so that the first message in the queue at each node is transmitted during one cycle of operation of the bus 18, and so on. Thus in due course the bus request logic will receive a "bus grant" signal from the bus 18 and will then cause the message in FIFO 24 to be put onto the bus 18 by a transmitter 26.

Assuming now that the arrangement of FIG. 4 is that of a node receiving the transmitted message, the handling of that message will be described. When the CPU 13 grants a bus request, a clock signal is transmitted on one of the control lines of the bus 18. This clock signal is used to initiate a message transmission and reception cycle. When the message has been transmitted, it is checked for validity by the CPU 13 in accordance with conventional routines, e.g. a parity check, and if the data on the bus is found to be valid a "data valid" signal is transmitted on the other control line of the bus 18. Thus the transmitted message is bracketed by the clock and data valid signals.

The transmitted data and address are loaded into a latch 27 by a receiver 28, and the address is loaded into an address comparator 29. The data valid signal is detected by data valid detector 30. An AND gate 31 has its inputs connected to the comparator 29 and detector 30. A predetermined range of addresses is set in the comparator corresponding to those parts of the data store 16 which can be written to by nodes other than that to which the store 16 is local. If the received address is within the range, and the data valid signal is detected, the gate 31 transfers the message data in latch 27 to a FIFO 32 which stores a queue of up to sixty four messages containing data to be written to the store 16.

When the FIFO 32 has a message to be written to the store 16, a memory transfer request is made to a request logic circuit 33 which communicates with the store 16 and in due course receives a request grant signal from the store 16. The first message in the queue in FIFO 32 is then released to update the appropriate address of store 16.

It may be that a significant number of messages build up in the FIFO's 24 and 32 containing data items which are in due course written to the stores in an order different from the chronological order in which they were generated. However, as each address for shared data can only be written to by its own unique "master" node, and the messages generated by that node are assembled in and transmitted from the FIFO 24 in chronological order, each individual memory address is updated in the correct order. The data in different addresses may get out of chronological step somewhat but in real time interactive systems the rate of change of stored parameters is relatively slow when compared with the iteration rate of the system and therefore this does not present a problem. There is thus no need for the system designer to impose strict procedures to maintain chronology, it being merely necessary to set the address comparators 21 and 29 correctly. The system is therefore very flexible and relatively easy to implement even when considering very complex real time tasks such as flight simulation.

The four node identity lines (FIG. 3) of bus 18 identify the node originating a message transmitted on the bus. This information is not required to enable data to be handled by the read/write sense logic 17 (FIG. 4) but is provided to enable traffic on the bus 18 to be monitored. Faults and "bottlenecks" on the bus 18 can be more easily detected and dealt with if this extra information is available.

Figure 5:
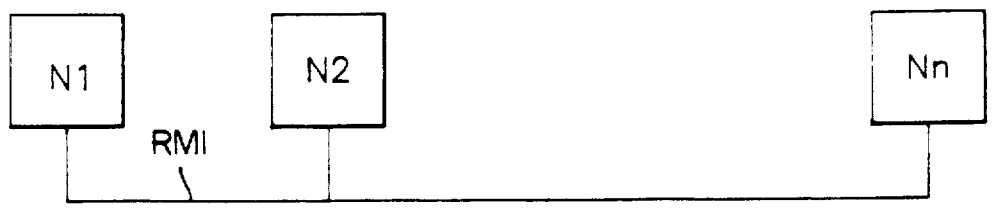
Figure 6:
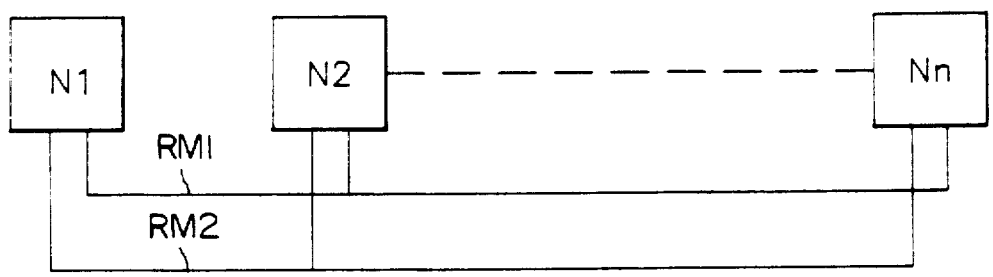
Figure 7:
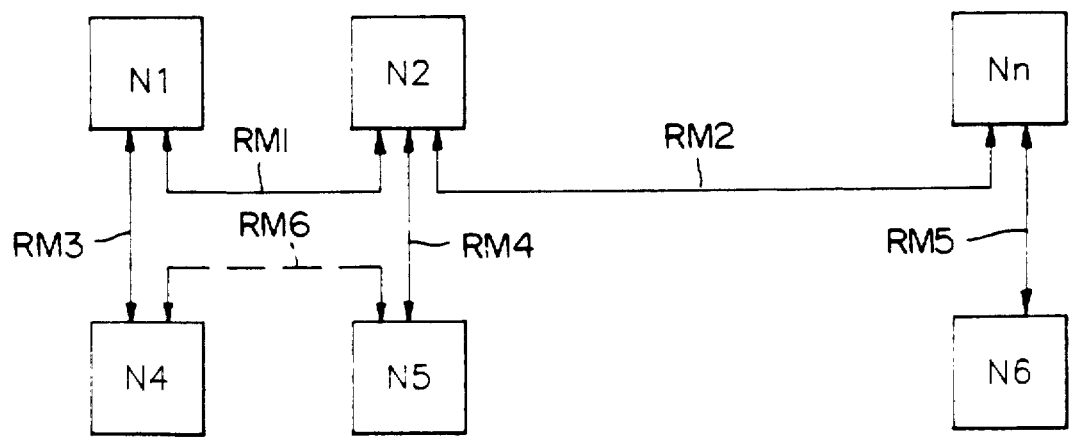

FIGS. 5 to 7 schematically illustrate three system configurations that are possible with the present invention. FIG. 5 shows the configuration of FIG. 2, that is a series of nodes N connected by a single reflected memory bus RM1. FIG. 6 shows a configuration similar to that of FIG. 5 but with parallel reflected memory buses RM1 and RM2. In such an arrangement the system would normally operate using bus RM1 with bus RM2 idle, but in the event of damage to bus RM1 the system could switch substantially immediately to bus RM2. By monitoring the condition of the buses and routing RM1 and RM2 separately a failsafe/self healing arrangement can be achieved. Further system security could be obtained by duplicating the processing nodes themselves with one normally operating and the other on hot standby, each of the pair of nodes being connected to both the buses RM1 and RM2.

In the arrangements of FIGS. 5 and 6 each reflected memory bus is connected to each node so that the two nodes that are farthest apart must be no further apart than the carry range of the bus, typically forty feet at 26.6 MB/Sec. In some circumstances it is highly desirable to be able to locate nodes at a greater distance apart than this, e.g. in shipboard fire control systems where one seeks to retain system operability even if a node is totally destroyed and to widely distribute the nodes so that localised damage cannot disable a significant number of nodes. FIG. 7 illustrates an arrangement in accordance with the invention which enables the distance between closest adjacent nodes to be equal to the maximum carry range of the reflected memory bus.

In the arrangement of FIG. 7, a series of six nodes N1 to N6 are arranged effectively in five pairs N1 N2, N2 N3, N1 N4, N2 N5 and N3 N6 with each pair operating in accordance with the procedures described above with reference to FIG. 2. The pairs of nodes are linked by respective reflected memory buses RM1 to RM5. Each node has a memory partitioned into local and shared data sections, but the shared data section is further partitioned into sub-sections each dedicated to a respective reflected memory bus. Thus each node has a shared data section, but that of node N1 is divided into two sub-sections, that of node N2 is divided into three sub-sections, and that of node N4 is not subdivided. Each sub-section of the shared memory bas its own read sense circuit equivalent to components 27 to 33 of FIG. 4.

Assuming that node N1 generates data to be shared, then that data has an address unique throughout the system to which only node N1 can write. Node N1 attempts to write that data into each of its shared memory sub-sections and is successful only if the address allocated to the data is within the range set by the address comparator of the read sense logic. Assuming the data is written to each of the sub-sections that data is then transferred to nodes N2 and N4. At node N2, software controls the transfer of the freshly written data in its own shared memory to nodes N3 and N5 by copying data from the memory sub-section devoted to memory bus RM1, into the memory sub-sections devoted to memory buses RM2 and RM4 . A further transfer is arranged from node N3 to N6. Because each memory location can be written to by only one node, relatively simple procedures can be followed for transferring data between nodes. In the illustrated arrangement there is only one possible route for data between any two nodes. This need not be the case however. For example a further memory bus RM6 may be provided as shown by dotted lines between nodes N4 and N5. If data originating at node N1 was to be written in the shared memory of node N5 the software could be arranged to transfer the data via RM1 and RM4, or, if that failed, to alternatively select the route RM3 and RM6. All that is required is a software routine controlling the sub-sections of the shared data memories to which the data is written.

Figure 8:
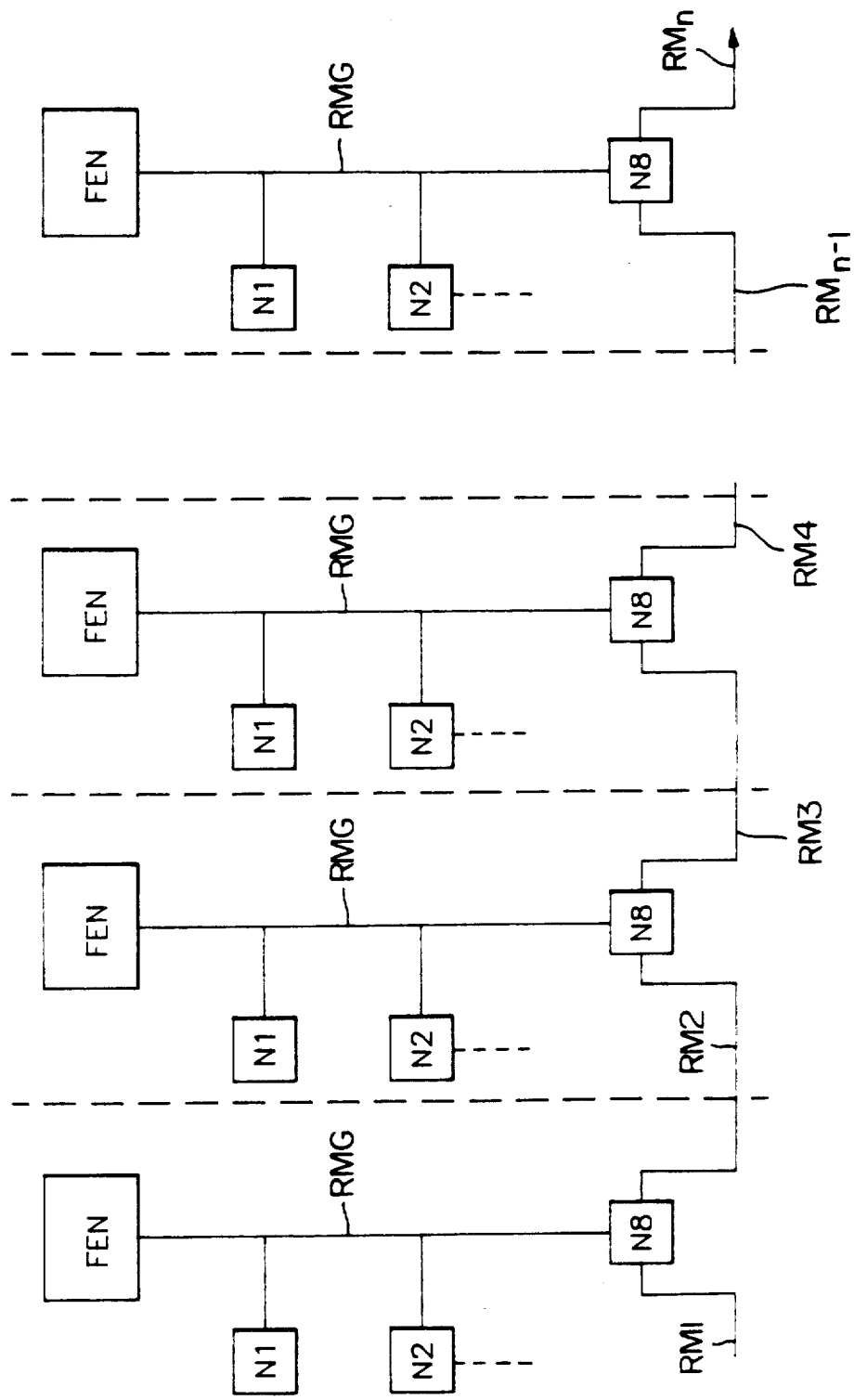

The arrangement of FIG. 8 is similar to that of FIG. 7 except that rather than having single nodes interconnected in pairs by respective reflected memory buses the nodes are interconnected in groups each containing nine nodes and these groups are in turn interconnected in pairs by further reflected memory buses connected to only one node within each group. As shown in FIG. 8, each group comprises a front end processor node FEN similar to that including processing unit 13 in FIG. 2 interconnected by a reflected memory bus RMG to eight further nodes N1 to N8 similar to those including processing units 11 in FIG. 2. The nodes N8 are connected in pairs by reflected memory buses RM1 to RMn and operate as "software exchanges" in the same manner as is the case with the node N2 in FIG. 7.

Figure 9:
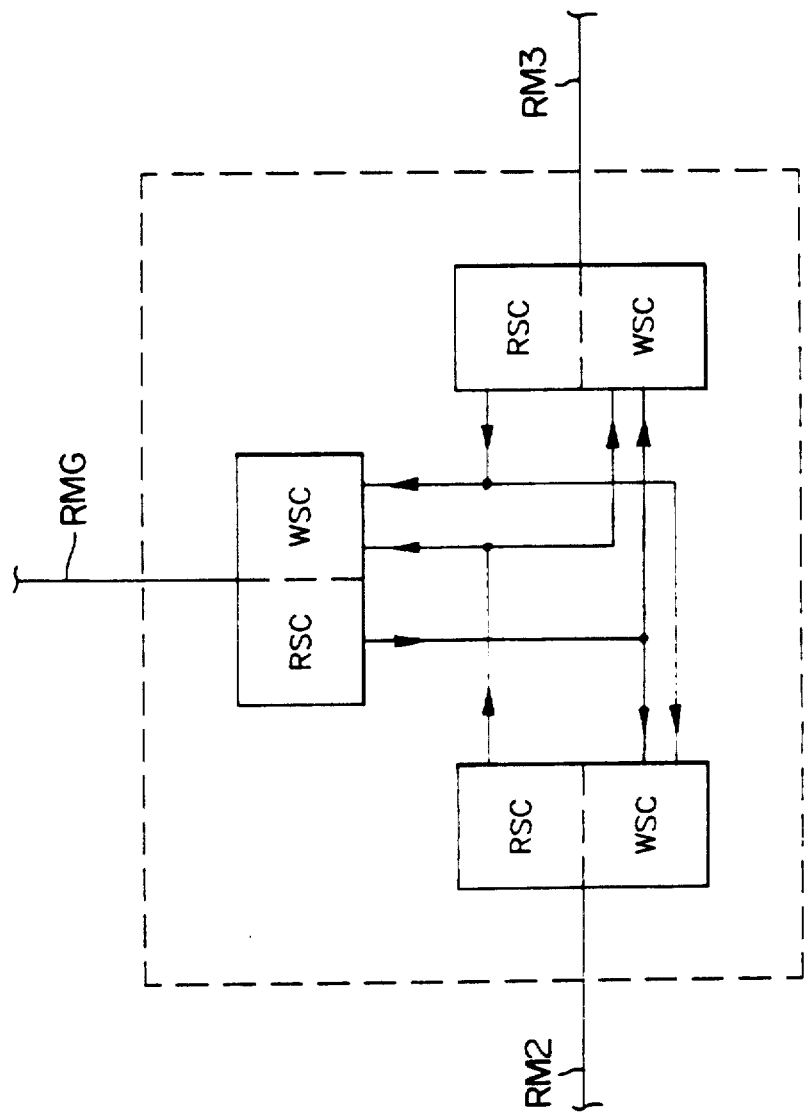

The "software exchanges" between different reflected memory buses introduce some delays in the transfer of data between the buses. FIG. 9 illustrates a "repeater" arrangement designed to replace the "software exchange" and thereby provide an automatic hardware connection which speeds up data transfer.

Referring to FIG. 9, the illustrated repeater replaces the node N8 between buses RM2 and RM3 and comprises three sets of read/write sense hardware similar to the read/write sense hardware 17 of FIGS. 2 and 4. Each set comprises a read sense circuit RSC and a write sense circuit WSC for each port to which a reflected memory bus is connected, each read sense circuit communicating data to the write sense circuits of the other two ports. Each port has its own partitioned address the range of which is set to limit the transfer of data between buses to that which is required. Thus the repeater reacts in exactly the same way as the other nodes on the buses to which it is connected and data transferred to a reflected memory bus by a repeater is handled in exactly the same way as data generated by any other node on that bus. Data is buffered through the repeater by FIFO circuits to control bus access as with a normal node. There is no software overhead involved in data transfers between buses, and traffic on the buses is limited to that which is essential by selecting the range of addresses for which data can be transferred by each read/write sense circuit. Thus the system operates at a high speed making it easier to use relatively low data rate buses with a long carry range.

The repeater facilitates the provision of a hot standby system which is kept fully updated so that it can be switched in at once in the event of, a failure. The repeater itself could be duplicated.

What is claimed is:

1. A data processing system comprising a plurality of nodes and a data bus interconnected therewith,
   at least one processing node comprising:
   a dual port local data store partitioned into sections, a first section reserved for the storage of data local to the node and not to be shared with the other nodes and a second section reserved for data shared with other processing nodes;
   a processor;
   a local bus connecting a first port of the local data store to the processor for transferring data to the local data store; and
   read/write sense logic means connected to the local bus for sensing when the processor is transferring data to the local store, connected to the data link for transmitting sensed data onto the data link for sharing with another node and for sensing received data from the data link which is being shared from another node and for inputting sensed received data through a second port of the local data store;
   said read/write sense logic means comprises:
   first address comparator means for comparing an address of a signal transmitted by the processor to said first port, to determine if the signal is within a first range of allowable addresses for shared data;
   successful write detector means for detecting the presence of a successful write signal on the local bus;
   first latch means for holding data transmitted by the processor on the local bus;
   first gate means for receiving signals from the first address comparator means and the successful write detector means and for activating the first latch means upon receipt of signals indicating the address is within the first range of allowable addresses and a successful write to memory has occurred;
   first FIFO register means for receiving data from the first latch means responsive to activation of the first gate means;
   bus request logic means for generating a bus request signal to transmit data stored in the first FIFO register means along the data bus and for releasing data from the first FIFO register means upon receipt of a bus grant signal from another node designated as master node;
   transmitter means for receiving data from the first FIFO register means and transmitting the data along the data bus to other nodes responsive to receipt of the bus grant signal by the bus request logic means;
   receiver means for receiving signals from the data bus;
   data valid detector means for detecting the presence of a data valid signal on the data bus;
   second address comparator means for receiving an address of a signal received by the receiver means and determining if the address is within a second range of allowable addresses for shared data;
   second latch means for holding data signals received by the receiver means;
   second gate means for receiving signals from the data valid detector means and the second address comparator means and for activating the second latch means upon receipt of signals indicating the address is within the second range of allowable addresses and a valid data signal was received by the data valid detector means;
   second FIFO register means for receiving data from the second latch means responsive to activation of the second latch means;
   memory transfer request means for generating a signal requesting access to the local data store through the second port of the local data store and for releasing data from the second FIFO register means to the local data store upon receipt of a signal granting access to the local data store.

2. A system as claimed in claim 1, wherein each processing node comprises a dual port local data store, a processor, a local bus and read/write sense logic means.

3. A system as claimed in claim 1, wherein said first range of allowable addresses is different from said second range of allowable addresses.

4. A data processing system comprising a plurality of nodes and a data bus interconnected therewith,
   at least one processing node comprising:
   a dual port local data store partitioned into sections, a first section reserved for the storage of data local to the node and not to be shared with the other nodes and a second section reserved for data shared with other processing nodes;
   a processor;
   a local bus connecting a first port of the local data store to the processor for transferring data to the local data store; and
   write sense logic means connected to the local bus for sensing when the processor is transferring data to the local store and connected to the data link for transmitting sensed data onto the data link for sharing with another node;
   said write sense logic means comprises:

first address comparator means for comparing an address of a signal transmitted by the processor to said first port, to determine if the signal is within a first range of allowable addresses for shared data;

successful write detector means for detecting the presence of a successful write signal on the local bus;

first latch means for holding data transmitted by the processor on the local bus;

first gate means for receiving signals from the first address comparator means and the successful write detector means and for activating the first latch means upon receipt of signals indicating the address is within the first range of allowable addresses and a successful write to memory has occurred;

first FIFO register means for receiving data from the first latch means responsive to activation of the first gate means;

bus request logic means for generating a bus request signal to transmit data stored in the first FIFO register along the data bus and for releasing data from the first FIFO register means upon receipt of a bus grant signal from another node designated as master node; and transmitter means for receiving data from the first FIFO register means and transmitting the data along the data bus to other nodes responsive to receipt of the bus grant signal by the bus request logic means.

5. A processing system comprising:

plural processing nodes, each node comprising a memory having a shared store, and a data write means for writing data to the memory of the node; and data reflecting means for reflecting data written by a first data write means of a first node to the shared store of said first node and writing said data to other shared stores of other nodes independently of the data write means of said nodes, comprising:

a data link; and plural control means, all of the plural control means being connected to the data link, each control means having an associated node in which the memory of said associated node is connected to said control means, each said control means being for detecting data written by the data write means to the shared store of the associated node of the control means and transmitting said data via the data link means to other control means, each said control means also being for receiving data transmitted via the data link and writing said data into the shared store of the node associated with said control means.

6. The processing system of claim 5, wherein each control means comprises:

a write logic sensor for sensing data being written to the memory of the associated node of each said control means;

a comparing means for determining if said sensed data is being written within a predetermined address range in the shared store of the memory of said associated node;

a queuing means for queuing sensed data determined to be written within said first predetermined address range; and a transmitter means for transmitting queued data onto the data link.

7. The processing system of claim 6, wherein each control means further comprises:

a receiver for sensing transmitted data on the data link; and a further queuing means for receiving from the receiver said transmitted data, queuing said received data, and writing said queued data into the shared store of the associated node of the control means.

8. The processing system of claim 7, wherein the receiver of each control means further comprises a comparing means for determining if said transmitted data has an address within a further predetermined address range, and the further queuing means of each control means is adapted to only queue data that is determined to have an address within said further predetermined address range and to write said queued data within an address range corresponding to said further predetermined address range in the shared store of the memory of the associated node of the control means.

9. The processing system of claim 5, wherein the data reflecting means is adapted to reflect and write data, which data has been detected by one of said control means as being written by the data write means within a predetermined address range of the shared store of the associated node of said one of said control means, to each shared store of all other of the plural processing nodes within an address range corresponding to said predetermined address range.

10. The processing system of claim 9, wherein said data write means of said associated node of said one of said control means is adapted to write said data within said predetermined address range of said shared store, and each other data write means is adapted so as not to write data in the shared store of the node of within said address range corresponding to said predetermined address range.

11. The processing system of claim 5, wherein the data link comprises a bus and a bus logic control for granting said first data control means access to the bus for transmitting said data to said other shared stores of said other nodes.

12. The processing system of claim 11, wherein the bus logic circuit is adapted for granting plural control means access to the bus in a predetermined order and during a same cycle of bus operation.

13. The processing system of claim 5, further comprising an input means connected to said data link for reflecting input data to the shared stores of each node independently of the data write means of said nodes.

14. The processing system of claim 13, wherein the input means comprises a memory mapped input/output device.

15. The processing system of claim 5, wherein each said data write means comprises a processing means.

16. The processing system of claim 5, wherein one data write means is master of a predetermined range of addresses in each shared store such that other data write means cannot write data within said predetermined range of addresses.

17. The processing system of claim 5, wherein the data reflecting means is adapted to reflect and write data, which data has been detected by one of said control means as being written by the data write means to the shared store of the associated node of said one of said control means, to the shared stores of all other of the plural processing nodes.

18. The processing system of claim 5, wherein the memory of each said node has more than one data port.

19. The processing system of claim 5, wherein said nodes are connected via said data reflecting means such that data may be reflected from a first node to a second node via a third node.

20. The processing system of claim 5, wherein said nodes are connected via said data reflecting means such that data may be reflected from a first node to a second node and a third node simultaneously.

21. A processing system comprising:
a first processing node comprising a first memory having a first shared store, and a first data write means for writing first data to the first shared store of the first memory;
a second processing node comprising a second memory having a second shared store, and a second data write means; and
data reflecting means for reflecting the first data to the second shared store independent of the first and second write means, the data reflecting means comprising:
a data link for transferring the first data to the second shared store;
a first and second control means, each control means being connected to the data link means, the first control means being further connected to the first memory and the second control means connected to the second memory, the first control means being for detecting the first data being written to the first shared store and transmitting the first data via the data link to the second control means, and the second control means being for receiving said first data transmitted via the data link and writing said first data into the second shared store of the second memory.

22. The processing system of claim 21, wherein the first control means comprises:
a write logic sensor for sensing data being written to the first memory;
a first comparing means for determining if data is being written within a first predetermined address range in the first shared store;
a first queuing means for queuing data determined to be written within said first predetermined address range; and
a first transmitter means for transmitting queued data onto the data link.

23. The processing system of claim 22, wherein the second control means comprises:
a receiver for sensing transmitted data on the data link; and
a second queuing means for receiving from the receiver said transmitted data, queuing said data, and writing said data into the second shared store.

24. The processing system of claim 21, further comprising an input device connected to said data link for reflecting input data to the first and second shared stores independently of the first and second data write means.

25. The processing system of claim 24, wherein the input device comprises a memory mapped input/output device.

26. The processing system of claim 21, wherein each said data write means comprises a processing means.

27. The processing system of claim 21, wherein the first processing node is adapted for writing said first data within a predetermined address range of the first shared store, and the data reflecting means is adapted for writing said first data into the second shared store within an address range corresponding to said predetermined address range.

28. The processing system of claim 21, wherein the data link comprises a bus and a bus logic circuit for granting said first control means access to the bus for transmitting said first shared store data to the second control means.

29. A processing system comprising:
a first processing node comprising a first memory having a first shared store, and a first data write means comprising a processor for writing first data to the first shared store of the first memory;
a second processing node comprising a second memory having a second shared store, and a second data write means; and
data reflecting means for reflecting the first data to the second shared store independent of the first and second write means, the data reflecting means comprising:
a data link for transferring the first data to the second shared store;
a first and second control means, each control means being connected to the data link means, the first control means being further connected to the first memory and the second control means connected to the second memory, the first control means being for detecting the first data being written to the first shared store and transmitting the first data via the data link to the second control means, and the second control means being for receiving said first data transmitted via the data link and writing said first data into the second shared store of the second memory, wherein the first control means comprises:
a write logic sensor for sensing data being written to the first memory;
a first comparing means for determining if data is being written within a first predetermined address range in the first shared store;
a first queuing means for queuing data determined to be written within said first predetermined address range; and
a first transmitter means for transmitting queued data onto the data link, and wherein the second control means comprises:
a receiver for sensing transmitted data on the data link; and
a second queuing means for receiving from the receiver said transmitted data, queuing said data, and writing said data into the second shared store in an address range corresponding to said first predetermined address range.

30. The processing system of claim 29, further comprising an input device connected to said data link for reflecting input data to the first and second shared stores independently of the first and second data write means.

31. The processing system of claim 30, wherein the input device comprises a memory mapped input/output device.

32. The processing system of claim 29, wherein the data link comprises a bus and a bus logic control for granting said first control means access to the bus for transmitting said first data to the second control means.

33. A data reflecting means for reflecting data between plural processing nodes independently of said plural processing nodes, said data reflecting means comprising:

a data link; and plural data transfer means, all of the plural data transfer means being connected to the data link, each data transfer means having an associated processor node and comprising a shared memory and a control means for detecting data being transferred from its associated processor node to the shared memory and transmitting said detected data via the data link to other of said plural data transfer means, each said data transfer means also being for receiving data transmitted via the data link and writing said transmitted data into its shared memory.

34. The data reflecting means of claim 33, wherein each control means comprises:

a write logic sensor for sensing data being written to the shared memory of the data transfer means of said control means from said data transfer means's associated processor node;

a queuing means for queuing sensed data; and a transmitter means for transmitting queued data onto the data link.

35. The data reflecting means of claim 34, wherein each control means further comprises:

a receiver for sensing transmitted data on the data link; and a further queuing means for receiving from the receiver said transmitted data, queuing said received data, and writing said queued data into the shared memory of the data transfer means of said control means.

36. The data reflecting means of claim 35, wherein the receiver of each control means further comprises a comparing means for determining if said transmitted data has an address within a predetermined address range, and the further queuing means of each control means is adapted to only queue data that is determined to have an address within said further predetermined address range.

37. The data reflecting means of claim 34, wherein each control means further comprises a comparing means for determining if said sensed data is being written within a predetermined address range in the shared memory of the data transfer means of said control means, and the queuing means is adapted to only queue data that is determined to have an address within said predetermined address range.

38. The data reflecting means of claim 33, wherein the data reflecting means is adapted to reflect and write data, which data has been detected by one of said control means as being transferred to a predetermined address range within the memory of the data transfer means of said one of said control means from its associated processor node, to the shared memory of at least one other data transfer means within an address range corresponding to said predetermined address range.

39. The data reflecting means of claim 38, wherein said associated processor node of said one of said control means is adapted to write said data within said predetermined address range of the shared memory of the data transfer means of said one of said control means, and each other associated processor node is adapted so as not to write data in the shared memory of its associated data transfer means within an address range corresponding to said predetermined address range.

40. The data reflecting means of claim 33, wherein the data link comprises a bus and a bus control for granting said first data control means access to the bus for transmitting said data to said other shared stores of said other nodes.

41. The data reflecting means of claim 40, wherein the bus control is adapted for granting plural data transfer means access to the bus in a predetermined order and during a same cycle of bus operation.

42. The data reflecting means of claim 33, wherein the data reflecting means is adapted to reflect and write data, which data has been detected by one of said control means as being transferred to the memory of the data transfer means of said one of said control means from its associated processor node, to the shared memory of all other of the data transfer means.

43. A data reflecting means for reflecting data between plural processing nodes independently of said plural processing nodes, said data reflecting means comprising:

a data link; and plural data transfer means, all of the plural data transfer means being connected to the data link, each data transfer means having an associated processor node and comprising:

a shared memory; and a control means for detecting data being transferred from its associated processor node to the shared memory and transmitting said detected data via the data link to other of said plural data transfer means, each said data transfer means also being for receiving data transmitted via the data link and writing said transmitted data into its shared memory, each control means comprising:

a write logic sensor for sensing data being written to the shared memory of the data transfer means of said control means from said data transfer means's associated processor node;

a queuing means for queuing sensed data;

a transmitter means for transmitting queued data onto the data link;

a receiver for sensing transmitted data on the data link; and a further queuing means for receiving from the receiver said transmitted data, queuing said received data, and writing said queued data into the shared memory of the data transfer means of said control means.

44. The data reflecting means of claim 43, wherein the data link comprises a data link control for granting a control means of one of said plural data transfer means access to the data link for transmitting data to other data transfer means.

45. The data reflecting means of claim 44, wherein the data link control is adapted for granting plural data transfer means access to the data link in a predetermined order and during a same cycle of data link operation.

46. The data reflecting means of claim 43, wherein the receiver of each control means further comprises a comparing means for determining if said transmitted data has an address within a predetermined address range, and the further queuing means of each control means is adapted to only queue data that is determined to have an address within said further predetermined address range.

* * * * *